United States Patent [19]

McGarry et al.

[11] Patent Number: 5,248,742
[45] Date of Patent: Sep. 28, 1993

[54] UNSATURATED POLYESTER-EPOXY RESIN NETWORK COMPOSITION

[75] Inventors: Frederick J. McGarry, Weston; Ramnath Subramaniam, Cambridge, both of Mass.

[73] Assignee: GenCorp Inc., Fairlawn, Ohio

[21] Appl. No.: 874,788

[22] Filed: Apr. 27, 1992

[51] Int. Cl.⁵ .................. C08F 283/01; C08F 283/10
[52] U.S. Cl. ............................. 525/531; 525/31; 525/119; 525/122; 525/533; 525/942; 528/297
[58] Field of Search .............. 525/531, 31, 119, 122, 525/533, 942; 528/297

[56] References Cited

U.S. PATENT DOCUMENTS

| Re. 31,577 | 5/1984 | Riew | 525/168 |
| 4,038,339 | 7/1977 | Foster | 424/418 |
| 4,088,708 | 5/1978 | Riew | 428/418 |
| 4,242,415 | 12/1980 | Feltzin et al. | 428/412 |
| 4,245,059 | 1/1981 | Ichimura et al. | 525/168 |
| 4,419,487 | 12/1983 | Rowe | 525/38 |
| 4,530,962 | 7/1985 | Alexander | 525/31 |
| 4,608,404 | 8/1986 | Gardner et al. | 523/400 |
| 4,824,500 | 4/1989 | White et al. | 525/531 |
| 4,861,832 | 8/1989 | Walsh | 525/113 |
| 4,866,134 | 9/1989 | Takano et al. | 525/109 |
| 4,891,403 | 1/1990 | Farris | 525/26 |
| 5,019,608 | 5/1991 | Shah | 525/109 |

Primary Examiner—John C. Bleutge
Assistant Examiner—Randy Gulakowski

[57] ABSTRACT

A unsaturated polyester resin composition is described that contains an epoxy resin reacted with an amine-terminated flexible polymer while dissolved in the unsaturated polyester resin and its ethylenically unsaturated crosslinking monomer. A compatible system results from the reaction which has a controllable modulus based on the amount of flexible polymer included in the resin. The resin is generally transparent if unfilled and has a higher calculated fracture energy than similar unsaturated polyester resin without modification. The unsaturated polyester resin can be filled with particulate filler or reinforced with fibrous fillers.

11 Claims, 5 Drawing Sheets

UNSATURATED POLYESTER-EPOXY RESIN NETWORK COMPOSITION

FIELD OF INVENTION

This invention relates to a thermosetting unsaturated polyester resin composition that contains an epoxy resin and an amine-terminated flexible polymer. The applications for this resin include neat compositions, fiber reinforced compositions, highly filled compositions and compositions that are both highly filled and fiber reinforced. This invention makes use of functionally terminated flexible polymers that are reacted within the resin matrix to add toughness and flexibility.

BACKGROUND

Unsaturated polyester networks are well known for their thermal and mechanical properties especially when reinforced with fibers and highly filled. Such materials are used in boat hulls and automobile body parts. These resins are inherently brittle, and attempts to toughen the compositions without sacrificing thermal and mechanical properties were made. U.S. Pat. No. 4,419,487 discloses the use of carboxyl terminated reactive liquid polymers to toughen polyester resins. U.S. Pat. No. 4,530,962 discloses that epoxy resin terminal groups on low molecular weight elastomers makes the molecules sufficiently compatible with polyester that a homogeneous dispersion of elastomer particles can be achieved on cure. This dispersion resulted in decreased brittleness and increases in fracture energy.

SUMMARY OF THE INVENTION

Figure 1:
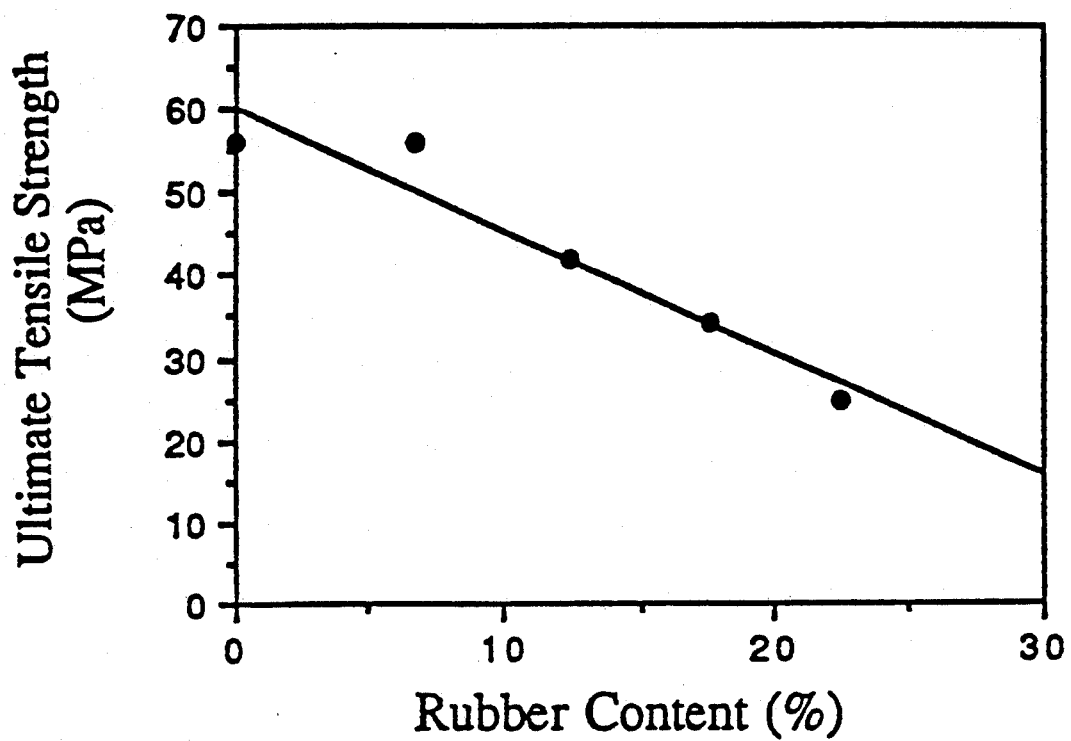
FIGS. 1, 2, and 3 show the variations in physical properties of the unsaturated polyester resin composition of this application with various weight percents of flexible polymer segments.

It has been found that composite materials based on unsaturated polyesters that have increased elongations and increased fracture energy can be made from the reaction of an epoxy with an amine system in the presence of polyester resin with a vinyl crosslinking system. The amine is an amine-terminated flexible polymer that toughens the unsaturated polyester resin or at higher concentrations, can make the modified unsaturated polyester network flexible. The above polymeric system has higher calculated fracture energy than would the unsaturated polyester system alone. The resin can be used for molding applications requiring a toughened resin or in combination with fibrous or particulate matter to form a reinforced resin for molding applications.

DETAILED DESCRIPTION OF THE INVENTION

This invention relates to a unsaturated polyester polymer network having increased elongation and increased fracture energy. The modification results from reacting an epoxy resin with a flexible polymer segment having amine termination and a curative component for the amine-epoxy reaction in the presence of the unsaturated polyester and vinyl monomer crosslinking agent.

The epoxy and amine-terminated flexible polymer segments (usually rubbery segments) are dissolved in the unsaturated polyester resin and vinyl monomer prior to their reaction. The crosslinking of the unsaturated polyester resin with the vinyl monomer catalyzed by free radical initiators (catalysts) can occur concurrently with the epoxy-amine reaction or at a different stage of the processing. The relative rates of these reactions can be controlled by the choice of the reactive groups, the catalysts, and curative components used.

The unsaturated polyester epoxy network is a compatible network in that a transparent polymer network is formed whose properties are affected by the weight percent of each component. Thus, when the system is high in polyester resin and vinyl monomers, it has high modulus. When the amounts of amine-terminated flexible segments are higher, the network is quite flexible with low modulus. A gradual change in properties is seen as the relative amounts of the two components are varied.

Infrared spectrum analysis on model compounds indicate the amine-terminated flexible polymer can react with the double bonds in the unsaturated polyester. The reactions of the epoxy groups with the carboxyl groups of the unsaturated polyester can proceed rapidly in the presence of the curative components. Thus, in addition to the epoxy resin and amine-terminated flexible polymer reacting with each other, they can each individually react with the unsaturated polyester. The reaction of the amine-terminated flexible polymer with the unsaturated polyester or with epoxy resin groups attached to the unsaturated polyester physically constrain the amine-terminated flexible polymer from associating in dispersed phases of flexible polymer. Dynamic Mechanical Analysis (DMA) of products of this invention show broad tan $\delta$ peaks, such as 75° C. width at half maximum. Such broad tan $\delta$ peaks indicate intermixing on a near molecular scale and lack of phase separation into pure components with separate Tg values. Due to these reactions, the cured unsaturated polyester resin of this invention is desirably substantially free of phase separation and preferably free of phase separation.

The amounts of each component in the modified unsaturated polyester resin can vary depending on the modulus and fracture energy desired. The following amounts are based on 100 parts of the combined weight of the monomeric and polymeric resin components unless otherwise specified. The unsaturated polyester resin and its ethylenically unsaturated crosslinking monomers can vary from about 30 to about 70 parts and desirably is from about 40 to about 60 parts. The ethylenically unsaturated monomers can be present from about 1.5 to about 2.5 parts and desirably from about 1.8 to about 2.2 parts relative to each part by weight of fumarate unsaturation in the unsaturated polyester resin. The parts by weight of fumarate unsaturation is determined by NMR analysis of the unsaturated polyester. This is then converted to a weight percent fumarate which is used as the weight percent fumarate unsaturation. The unsaturated polyesters can have weight percent fumarate from about 25 to about 60 and desirably from about 30 to 55. The catalyst for cure of the unsaturated polyester with ethylenically unsaturated vinyl monomers can be present from about 0.1 to about 5 parts and desirably from about 0.5 to about 2.0 parts. The epoxy resin is present from about 10 to about 23 parts and desirably from about 13 to about 20 parts. The amine-terminated flexible polymer is be present from about 20 to about 47 parts and desirably from about 27 to about 40 parts. The curative component for the epoxy-amine reaction is present from about 0.1 to about 15 parts and desirably from about 0.2 to about 10 parts.

The epoxy resin component of the invention is comprised of one or more of the curable resins containing one or more 1,2-epoxy group per molecule. Example epoxy resins are discussed in U.S. Pat. Nos. 2,467,171; 2,615,007; 2,716,123; 3,030,336; and 3,053,855. Useful epoxy compounds include the butyl glycidyl ether; styrene oxide; phenyl glycidyl ether; p-butyl phenol glycidyl ether; polyglycidyl ethers of polyhydric polyols; cycloaliphatic epoxy resins made from epoxidation of cycloolefins with peracids; the polyglycidyl esters of aliphatic, cycloaliphatic, or aromatic polycarboxylic acids; the polyglycidyl ethers of polyphenols, such as bisphenol A; and novolak resins such as epoxy phenol novolak resins and epoxy cresol novolak resins; aromatic glycidal amine resins such as triglycidyl derivatives of p-aminophenol; with the aromatic and cycloaliphatic polyglycidyl compounds such as polyglycidyl ethers of bisphenol A of various molecular weights and phenyl glycidyl ether being currently preferred.

The amine-terminated flexible polymer segment gives the modified resin toughness and flexibility. The flexible segment can be made from polymers having a Tg of generally 0° C. or less and preferably below −20° C. Typical polymers of this group include amine-terminated polyethers, amine-terminated diene based polymers, amine-terminated hydrogenated diene or polyolefin base polymers, saturated polyesters, copolymers of vinyl substituted aromatics and conjugated dienes, and amine-terminated copolymers of nitrile rubber. The amine-terminated flexible polymers include branched polymers. The amine termination can be one or more ends of the polymer chains. Thus, as amine reactants, they can be mono-, di- or trifunctional. Also included in the definition are blends of mono-, di-, and trifunctional polymers.

The conversion of functional terminated polymers to amine termination is well known in the art. Examples include reacting hydroxyl-terminated polymers with diacids or anhydrides making carboxyl-terminated polymers. Carboxyl-terminated polymers can be reacted with diamines of various types to form amine-terminated polymers. Hydroxyl terminated polymers can be reacted with isatoic anhydride to create amine terminated polymers. Hydroxyl terminated polymers can also be reacted with $PCl_3$ and subsequently with $NH_3$ to form an alkyl halide and then an alkyl amine. Epoxy terminated polymers can be reacted with mono or polyamines to form amine terminated polymers.

Flexible polymers can be various polyethers which are either mono-, di- or triamino terminated. Such polyethers are generally made by reacting one or more alkylene oxides having from 2 to 10 carbon atoms such as propylene oxide with a strong base. Polyethers can be made by ring opening polymerization of tetrahydrofuran or epichlorohydrin using acid catalysts. The above mono-, di-, or triamino, terminated polyethers, as well as the preparation thereof, are well known to the art and are commercially available as Jeffamine from Texaco.

One class of the flexible polymer is the various mono-, di- or triamino terminated nitrile containing copolymers. These copolymers are prepared in accordance with conventional techniques well know to the art and to the literature and are generally made from one or more monomers of acrylonitrile or an alkyl derivative thereof with one or more conjugated dienes and optionally one or more monomers of acrylic acid, or an ester thereof. Examples of acrylonitrile monomers or alkyl derivatives thereof include acrylonitrile and alkyl derivatives thereof having from 1 to 4 carbon atoms such as methacrylonitrile, and the like. The amount of the acrylonitrile or alkyl derivative monomer is from about 1 percent to about 50 percent by weight and preferably from about 5 percent to about 35 percent by weight based upon the total weight of the nitrile containing copolymer.

The conjugated diene monomers generally have from 4 to 10 carbon atoms with from 4 to 6 carbon atoms being preferred. Examples of specific conjugated diene monomers include butadiene, isoprene, hexadiene, and the like. The amount of such conjugated dienes is generally from about 50 percent to about 99 percent by weight and preferably from about 55 percent to about 75 percent by weight based upon the total weight of the nitrile rubber forming monomers. The preferred amine-terminated butadiene/acrylonitrile copolymers contain an average of from about 1.7 to about 3 primary and/or secondary amine groups per molecule, preferably about 1.7 to about 2.3 primary or secondary amine groups per molecule and may have Brookfield viscosities measured at 27° C. of about 500 cps to about 2,500,000 cps, preferably about 500 cps to about 500,000 cps. The amine-terminated butadiene/acrylonitrile copolymers of the invention are well known articles of commerce and can be prepared by reacting a carboxyl-terminated or ester-terminated butadiene/acrylonitrile copolymer with at least one aliphatic, alicyclic or heterocyclic amine containing at least two primary and/or secondary amine groups. The amine-terminated liquid copolymers may also be prepared by reacting an acid chloride-terminated butadiene/acrylonitrile with at least one of the aforementioned amines. The methods of preparation are described in more detail in, for instance, U.S. Pat. No. 4,129,670, hereby incorporated by reference. Amine-terminated butadiene-acrylonitrile polymers (ATBN) are available from BFGoodrich under the name Hycar ®.

Still another class of flexible polymers is the various saturated polyesters made from reactions between aliphatic dicarboxylic acids, or aliphatic anhydrides of 2–10 carbon atoms with diols containing from 2 to 12 carbon atoms, and desirably 2 to 6 carbon atoms. Polyesters of carbonic acid can also be used and are made from phosgene or oarbonio acid esters as the diacid component. These are well known to the art and to the literature, as is the preparation thereof, and are commercially available. Optionally included within the above aliphatic dicarboxylic acids are minor amounts, that is up to 20 percent by weight based upon a total weight of the acids, of an aromatic diacid such as phthalic acid, isophthalic acid, terephthalic acid, and the like.

Another class of flexible polymers are the various conjugated dienes made from one or more monomers having from 4 to 12 carbon atoms, desirably from 4 to 8 carbon atoms with 4 or 5 carbon atoms being preferred. Examples of specific dienes include butadiene, isoprene, 2,3-dimethyl-1,3-butadiene, pentadiene, hexadiene, 4,5-diethyl-1,3-octadiene, and the like, with butadiene and isoprene being preferred. The structure of such conjugated dienes is generally such that it has a Tg within the above-noted ranges. Such polymers are terminated with either one or two functional end groups wherein the functional end group is amine. Such polymers are well-known to the art and are commercially available as from The BFGoodrich Chemical Co., under the Hycar ® trademark.

Another class of flexible polymer is the various hydrogenated dienes or polyolefins which are mono-, or di-, or triamino terminated. Such polymers, as well as the preparation thereof, are well known to the art and to the literature. Typical diene polymers are made from one or more conjugated dienes, having from 4 to 10 carbon atoms, such as 1,3-butadiene, isoprene, dimethyl butadiene, and the like. The hydroxy-functional polydienes may be hydrogenated, for example, partially or substantially (i.e., at least 50, 70, or 90 percent of the unsaturated sites), and even completely hydrogenated, according to any conventional method known to the art and to the literature. The hydrocarbon polymers generally have a number average molecular weight from about 500 to 15,000 and preferably from about 1000 to about 8,000. A hydrogenated butadiene polymer is commercially available as Polytail H and Polytail HA sold by Mitsubishi Kasei Corp.

Yet another class of the flexible polymers is the various copolymers made from vinyl substituted aromatics having from 8 to 12 carbon atoms and conjugated diene monomers generally having from 4 to 12 carbon atoms, desirably from 4 to 8 carbon atoms, and preferably 4 or 5 carbon atoms. Examples of suitable aromatic monomers include styrene, alphamethyl styrene, and the like, with specific examples of conjugated dienes including hexadiene, isoprene, butadiene, and the like. A preferred copolymer is a random styrene butadiene copolymer. The amount of the vinyl substituted aromatic component, such as styrene, is generally from about 1 part to about 50 parts, and desirably from about 1 part to about 30 parts by weight, based upon the total weight of the copolymer. The preparation of such polymers having mono- or di- amine-terminated vinyl substituted aromatic-conjugated diene copolymers are well known to the art and to the literature.

The amine-terminated flexible polymer segments are generally liquid polymers that enhance the toughness and pliability of polymers or copolymers. One elastomer-type is amine-terminated butadieneacrylonitrile that has an acrylonitrile content of about 5 to 40, preferably 7 to 30 percent by weight and a butadiene content of 95 to 60, preferably 93 to 70 percent by weight, based on the liquid butadiene/acrylonitrile copolymer.

The curative component for the epoxy amine reaction can consist of various amine-containing compounds that can function as catalysts or co-reactants. The curative component can be present from 0.1 to about 15, desirably about 0.2 to about 10 parts, and preferably about 0.5 to about 3 parts by weight per 100 parts of combined monomeric and polymeric resin components. The tertiary amines and Lewis acid catalysts generally function as catalysts. Other curative components that can function as co-reactants are generally aliphatic amines, amido amines, and phenol/urea/melamine formaldehydes. These curative components that can react as co-reactants are generally present at 20 percent by weight or less and desirably 10 percent by weight or less based on the total weight of amine-terminated flexible polymer and curative components. The preferred curative components are tertiary amines and salts of tertiary amines such as Ancamine ® K61B 2-ethyl hexanoic acid salt of 2,4,6 tris (N , N dimethylaminomethyl) phenol; tris(dimethylaminomethyl) phenol;N-benzyldimethylamine; dimethylaminomethyl phenol; diazabicycloundecene; triethylene diamine; and phenol, 2 ethylhexanoic acid, formic acid, and p-toluenesulfonic acid salts of diazabicycloundecene. The curing temperature for the epoxy-amine reaction is generally the same as the Crosslinking temperature (30° C. to 160° C.). It is known that some reaction of the epoxy-amine system may occur during mixing and storage.

The matrix material of the invention is generally an unsaturated polyester resin. Suitable unsaturated polyester resins which can be utilized in the present invention include products of the condensation reaction of low molecular weight diols, (that is, diols containing from 2 to 12 carbon atoms and desirably from 2 to 6 carbon atoms) with dicarboxylic acids or their anhydrides containing from 3 to 12 carbon atoms and preferably from 4 to 8 carbon atoms provided that at least 50 mole percent of these acids or anhydrides contain ethylenical unsaturation. Examples of diols include 1,2-propylene glycol, ethylene glycol, 1,3-propylene glycol, diethylene glycol, di-1,2-propylene glycol, 1,4-butanediol, neopentyl glycol, and the like. A preferred diol is propylene glycol. Mixtures of diols may also be advantageously used. Preferred acids include fumaric acid, maleic acid, whereas preferred anhydrides include maleic anhydride. Often, mixtures of acids and/or anhydrides are utilized with the preferred acids or anhydrides and such compounds include phthalic anhydride, terephthalic acid, isophthalic acid, adipic acid, glutaric acid, and the like, catalyzed by compounds such as organotitanates and organo tin compounds such as tetrabutyl titanate or dibutyl tin oxide, and the like.

Various other types of unsaturated polyesters can be utilized. Another type is described in R. J. Herold U.S. Pat. No. 3,538,043 which is hereby fully incorporated by reference. Typically, the polyesters are made by interpolymerization of maleic anhydride with oxiranes substituted with alkyls containing from 0 to 4 carbon atoms. Examples of oxiranes include ethylene oxide, propylene oxide, and butylene oxides. In addition to maleic anhydride, other anhydrides can be utilized in amounts up to 50 mole percent (i.e. from 0 to 50 mole percent) of the total anhydride charge, wherein said anhydride has from 4 to 10 carbon atoms, such as phthalic anhydride, nadic anhydride, methyl nadic anhydride, tetrahydrophthalic anhydride, succinic anhydride, and cyclohexane-1,2-dicarboxylic acid anhydride. The molar ratio of oxirane to anhydride can be from about 1.0 to about 2.0, and preferably from about 1.0 to about 1.3.

In the preparation of the unsaturated polyesters from oxiranes and anhydrides, small amounts of initiators are utilized as from about 5 to about 30 parts by weight per 100 parts by weight of the polyester forming monomers. Examples of specific initiators include polyols, for example diols, triols, tetrols, having from 2 to 12 carbon atoms, or dicarboxylic acids containing from 3 to 10 carbon atoms, as for example fumaric acid, succinic acid, glutaric acid, and adipic acid. The molecular weight of the polyol is generally less than 500, preferably less than 200. Diols and dicarboxylic acid initiators result in linear, difunctional polyester chains with an average of two hydroxyl end groups per polymer chain. Triols produce polyester chains with an average of 3 arms and 3 hydroxyl end groups, and tetrols result in 4 arm chains with 4 hydroxyl end groups. Various catalysts can be utilized such as a zinc hexacyano cobaltate complex, and the like, as described in U.S. Pat. No.

3,538,043 which is hereby fully incorporated by reference.

Regardless of whether an unsaturated polyester made from an oxirane or a diol is utilized, the molecular weight thereof is from about 500 to about 10,000 and preferably from about 1000 to about 5,000.

Another important component is an ethylenically unsaturated monomer or crosslinking agent such as a polymerizable vinyl or allyl compound, such as a vinyl substituted aromatic having from 8 to 12 carbon atoms, as for example styrene, a preferred monomer, vinyl toluene, divinyl benzene, diallyl phthalate, and the like; acrylic acid esters and methacrylic acid esters wherein the ester portion is an alkyl having from 1 to 10 carbon atoms such as methyl acrylate, ethyl acrylate, and the like. Other unsaturated monomers include vinyl acetate, diallyl maleate, diallyl fumarate, and the like. Mixtures of the above compounds can also be utilized. The total amount of the unsaturated monomers generally varies from about 20 percent to about 50 percent and desirably from about 30 percent to about 40 percent by weight based upon the total weight of the ethylenically unsaturated monomers and the unsaturated polyester.

Optionally, various other components or additives can be utilized to form the molding compound composition. For example, various thermoplastic polymers (low profile or low shrinkage compounds) can be utilized. Typical low profile compounds include polyvinyl acetate, saturated polyesters, polyacrylates or methacrylates, saturated polyester urethanes, and the like. The amount of such polymers is from about 0 parts by weight to about 50 parts by weight, with from about 20 parts by weight to about 40 parts by weight being preferred based upon 100 parts by weight of unsaturated polyester and the ethylenicallY unsaturated monomer in the mixture.

Other additives which can also be utilized are known to the art and to the literature and include internal mold release agents such as zinc stearate; viscosity reducers; free radical inhibitors; mineral fillers such as calcium carbonate, Dolomite, clays, talcs, zinc borate, perlite, vermiculite, hollow glass, solid glass microspheres, hydrated alumina, and the like. The mold release agent and viscosity modifiers are used in effective amounts. The fillers can be present from 0 to about 60 weight percent, and desirably from 20-50 weight percent of the total composition weight. Free radical inhibitors are included to modify cure cycles by providing cure delay and moderating the cure exotherm. These free radical inhibitors can be present from 0.001 to 0.2 parts per 100 parts by weight combined modified resin components. They include benzoquinone, hydroquinone, and similar substituted quinones.

In addition to unsaturated polyesters, other suitable matrix materials include vinyl ester resins. The general structure of a typical vinyl ester resin, whose size can vary depending on the number of monomer units, is unsaturated polyester. These vinyl ester resins can be used as a partial or full replacement for the unsaturated polyester resin previously specified.

Conventional catalysts can be used to cure the matrix. Examples of such catalysts for the cure of unsaturated polyester or vinyl ester resins include organic peroxides and hydroperoxides such as benzoyl peroxide, dicumyl peroxide, cumene hydroperoxide, tert-butylperbenzoate, paramenthane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like. When curing is done in a mold at elevated temperatures, then the temperature varies from about 30° C. to about 160° C. and is desirably from about 80° C. to about 150° C. Alternatively, when photo sensitive agents are used, lower temperatures can be used.

The general procedure for mixing the precursors to the polymer networks involves dissolving the amine-terminated polymers, unsaturated polyester and epoxy in the styrene monomer. After a homogeneous mix is formed, the curative component for the epoxy amine reaction and the catalyst for the free radical reaction can be added to the blend.

Examples of fibers generally include any reinforcing fiber such as glass, aramid, nylon, polyester, graphite, boron, and the like, can be utilized in the invention. Fiber structure suitable for incorporation into the matrix include generally individual fibers, various types of woven fibers, or any general type of nonwoven fibers. Included within the woven class is any general type of woven fabrics, woven roving, and the like. Generally included within the nonwoven class is chopped strands, random or wound continuous filaments or rovings, reinforcing mats, nonreinforcing random mats, fiber bundles, yarns, non-woven fabrics, etc. Coated fiber bundles, comprising about 5 to about 50 or 150 strands, each having about 10 to about 50 fibers, highly bonded together with a conventional sizing agents such as various amino silanes, are preferred.

The fiber structure may be randomly distributed within the matrix or be arranged in selected orientations such as in parallel or cross plies or arranged in mats or woven fabrics, etc. The fibers may comprise from about 5 percent up to about 85 percent by weight of the composite and preferably from 20 percent to 50 percent by weight of the composite. The specific quantity of fiber structure in the composite can be varied consistent with the physical properties desired in the final composite molded article.

Compositions made in accordance with the invention can be utilized in wet layup, resin transfer molding, filament winding, bulk molding, and the like.

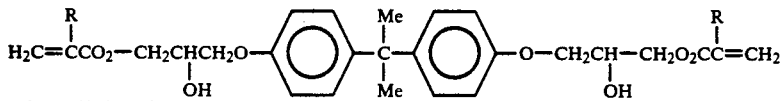

where R is a hydrogen atom or an alkyl group. Vinyl ester resins are prepared by reacting epoxy resins such as the addition products of 1-chloro-2,3-epoxypropane with 2,2'-bis(4-hydroxyphenyl)propane with either methacrylic or acrylic acid. The terminal unsaturation can be crosslinked with styrene in the same fashion as an

EXAMPLE 1

Two samples were made using an epoxy (Epon ® 828) and different amounts of the amine-terminated flexible polymer Hycar ® 1300X16. The amount of Ancamine ® K61B was increased in compositions with lower amounts of amine terminated flexible polymers. The recipes are shown in Table I.

TABLE I

|  | Sample A | Sample B |
|---|---|---|
| UPE as MR 13006 | 170 g | 170 g |
| Epon ® 828 | 50 g | 50 g |
| Hycar ® 1300X16 | 100 g | 50 g |
| Styrene Monomer | 119 g | 119 g |
| Ancamine ® K61B | 2.966 g | 4.16 g |
| t-BPB | 4.35 g | 4.35 g |
| Total Polymerizables | 439 g | 389 g |
| Rubber Content | 22.0 | 12.3 |

Epon ® 828 is an epoxy based on DGEBA of molecular weight of approximately 370–384 and having 2 functional groups per molecule. Unsaturated polyester (UPE) in MR 13006 is a polyester available from Aristech made from 30 weight percent propylene glycol, 7 weight percent ethylene glycol, 4 weight percent dipropylene glycol, 53 weight percent fumarate ester, and 6 weight percent maleate ester, having a molecular weight of about 1500. The UPE resin was 60 weight percent polyester in 40 weight percent styrene monomer. Hycar ® 1300x16 is the reaction product of a carboxyl terminated poly(butadiene-acrylonitrile) (CTBN) and N-aminoethylpiperazine (N-AEP). The polymer has an acrylonitrile content of about 16 percent by weight. It has an average amine equivalent weight of approximately 900. t-BPB is tertiarybutylperbenzoate. Ancamine ® K61B is described in the specification under epoxy-amine curative components.

These samples were cured in vertical molds, coated with Teflon for two hours at 100° C. and 11–12 hours at 120° C., without external pressure. The mechanical properties of Sample A and Sample B were determined per ASTM D-638. The results are shown in Table II.

TABLE II

| SP # | UTS {psi} (M Pa) | Strain Failure {%} | Modulus {Msi} (G Pa) |
|---|---|---|---|
| \multicolumn{4}{c}{SAMPLE A} | | | |
| 1 | 3581 (24.7) | 8.256 | 0.1856 (1.28) |
| 2 | 3618 (24.9) | 7.692 | 0.1975 (1.36) |
| 3 | 3713 (25.6) | 10.9 | 0.1979 (1.36) |
| 4 | 3666 (25.3) | 10.12 | 0.1902 (1.31) |
| 5 | 3636 (25.1) | 9.406 | 0.1819 (1.25) |
| Average | 3600 (24.8) | 9.276 | 0.1906 (1.31) |
| Std. Dev. | 50 (0.3) | 1.32 | 0.0071 (0.05) |
| \multicolumn{4}{c}{SAMPLE B} | | | |
| 1 | 6041 (41.6) | 2.348 | 0.38 (2.62) |
| 2 | 6013 (41.4) | 3.171 | 0.383 (2.64) |
| 3 | 6219 (42.8) | 2.951 | 0.352 (2.42) |
| Average | 6100 (42.0) | 2.823 | 0.372 (2.56) |
| Std Dev. | 100 (0.7) | 0.426 | 0.017 (0.12) |

UTS is the ultimate tensile strength. Strain Failure is the strain at which failure occurs.

Samples A and B show that a sample with higher amounts of 1300X16 (Sample A) has lower ultimate tensile strength and modulus but can be strained to higher percent strain before failure.

EXAMPLE 2

Samples were made up similar to A and B in the previous examples. The 1300X16 content was varied to give 0 to 22.37 percent by weight of the flexible component of the amine terminated flexible polymer. The UPE, Epon ® 828, and 1300X16 was first dissolved in styrene. Excess styrene was used beyond that in the MR 1300X16 to keep the ratio of unsaturation from styrene at three times the unsaturation from the unsaturated polyester. The solution was then degassed under vacuum until all frothing ceased. The solution was then poured into Teflon coated vertical molds and cured at 100° C. for two hours and 120° C. for about 12 hours. When the amount of 1300X16 was low, higher amounts of catalysts were used to assure reaction of the epoxy component. The ratio of polyester to epoxy was either approximately 2 to 1 or 1 to 1 in the recipes given in Table III. The physical properties of the modified unsaturated polyester networks are given in Table IV and FIGS. 1-5.

TABLE III

| | UPE:EPON | | | | | | | | |
|---|---|---|---|---|---|---|---|---|---|
| | 2:1 | | | | | 1:1 | | | |
| | Sample | | | | | | | | |
| | C | D | E | F | G | H | I | J | K |
| UPE as MR 13006 | 170 g | 170 g | 170 g | 170 g | 170 g | 150 g | 150 g | 152 g | 100 g |
| EPON ® 828 | 50 g | 50 g | 50 g | 50 g | 50 g | 90 g | 90 g | 100 g | 60 g |
| 1300X16 | 0 | 25 g | 50 g | 75 g | 100 g | 22.5 g | 45 g | 65 g | 60 g |
| Styrene Monomer | 120 g | 120 g | 120 g | 120 g | 120 g | 106 g | 106 g | 112 g | 72 g |
| Ancamine ® K61B | 5.2 g | 4.492 g | 3.98 g | 3.476 g | 2.966 g | 8.48 g | 8.31 g | 8.48 g | 4.62 g |
| t-BPB | 4.35 g | 4.35 g | 4.35 g | 4.35 g | 4.35 g | 3.88 g | 3.66 g | 3.88 g | 2.6 g |
| Total Polymerizables | 340 | 365 | 390 | 415 | 440 | 368 | 391 | 429 | 292 |
| % Flexible Polymer | 0 | 6.7 | 12.5 | 17.7 | 22.37 | 6 | 11.5 | 15 | 20 |

TABLE IV

PHYSICAL PROPERTIES OF POLYESTER NETWORK

| Sample | Flexible Polymer Content {%} | Modulus {Msi} (G Pa) | UTS {psi} (M Pa) | Strain Failure {%} | $K_{lc}$ ksi·in$^{\frac{1}{2}}$ (M Pa·m$^{\frac{1}{2}}$) | $G_{lc}$ {lb/in} (Pa·m) |
|---|---|---|---|---|---|---|
| C | 0     | 0.59 (4.07)  | 8100 (55.85) | 1.5      | 0.450 (.494) | 0.343 (60)    |
| D | 6.7   | 0.483 (3.33) | 8100 (55.85) | 2.347    | 0.849 (.933) | 1.492 (261.6) |
| E | 12.5  | 0.347 (2.39) | 6100 (42.06) | 3.023    | 0.794 (.873) | 1.817 (318.9) |
| F | 17.7  | 0.271 (1.87) | 4950 (34.13) | 5.319    | 0.843 (.926) | 2.622 (458.5) |
| G | 22.37 | 0.196 (1.35) | 3600 (24.82) | 9.276    | 0.815 (.895) | 3.389 (593.3) |
| H | 6     | .45 (3.10)   | 6700 (46.16) | 1.68     | —            | —             |
| I | 11.5  | .31 (2.14)   | 4900 (33.76) | 2.69     | —            | —             |
| J | 15    | .27 (1.86)   | 4000 (27.56) | 3.54     | —            | —             |
| K | 20    | .19 (1.31)   | 2950 (20.33) | 6.6–11   | —            | —             |

Figure 2:
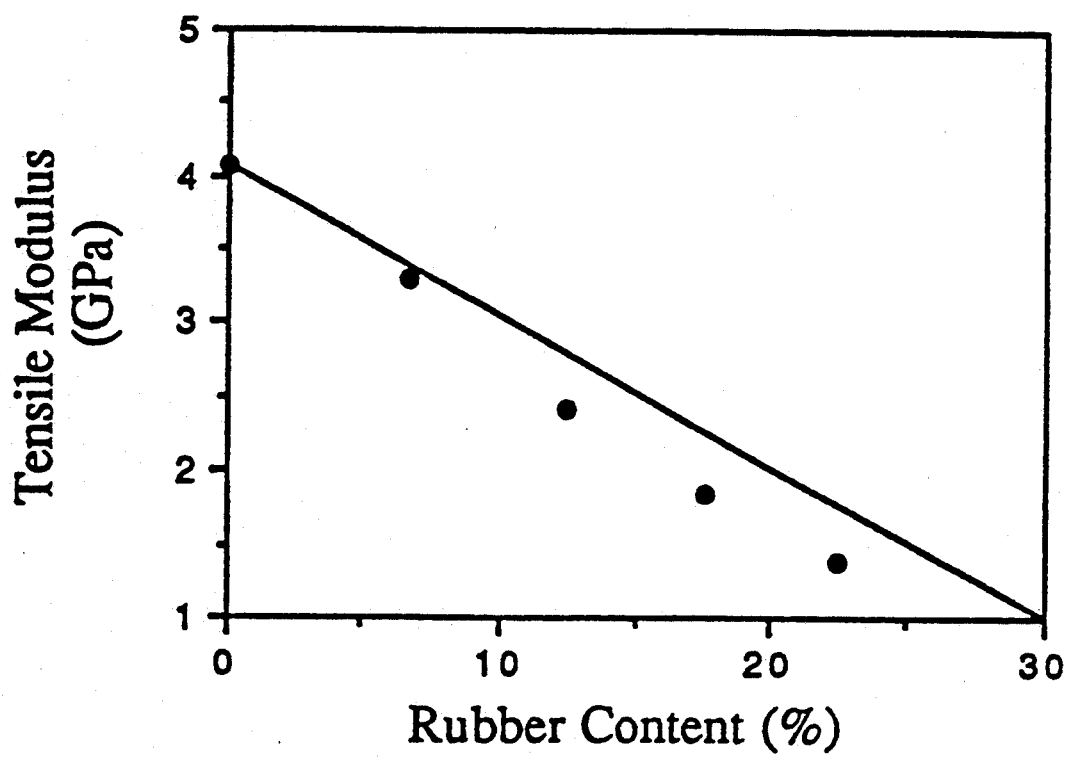
Figure 3:
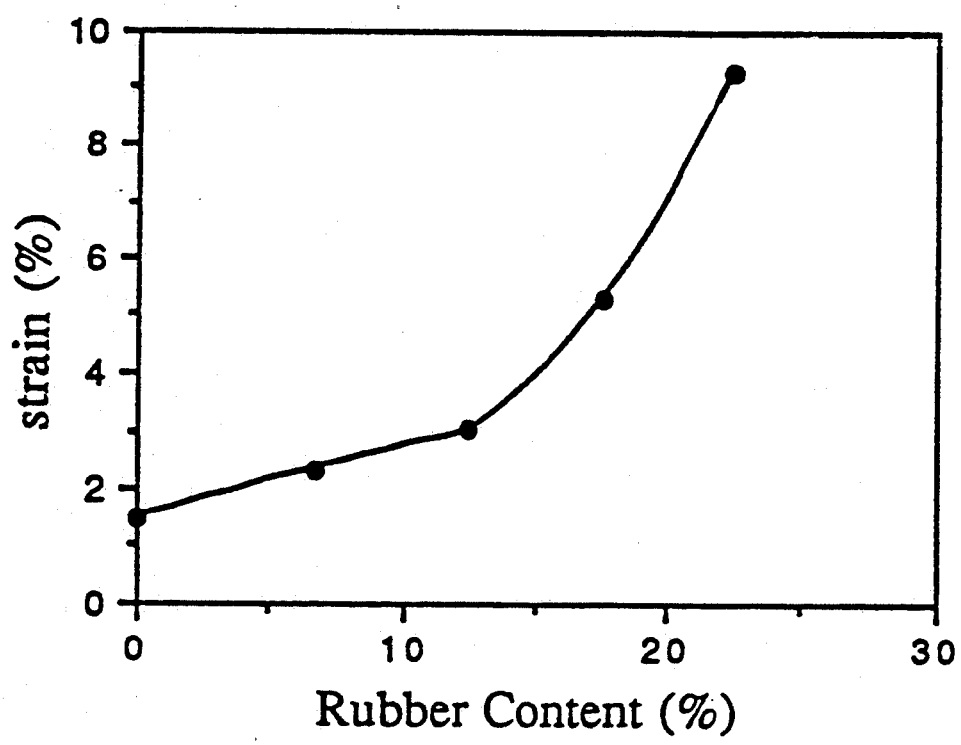
Figure 4:
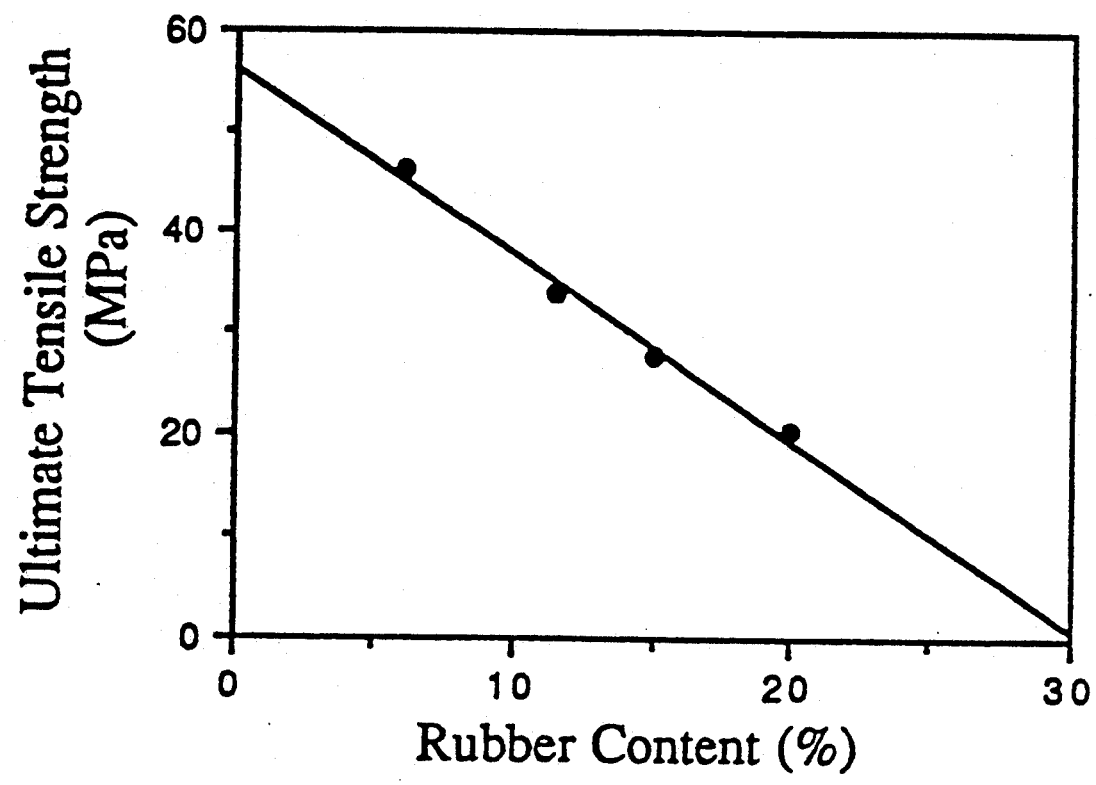
FIGS. 4 and 5 show similar compositions with a different weight ratio of epoxy to unsaturated polyester.
Figure 5:
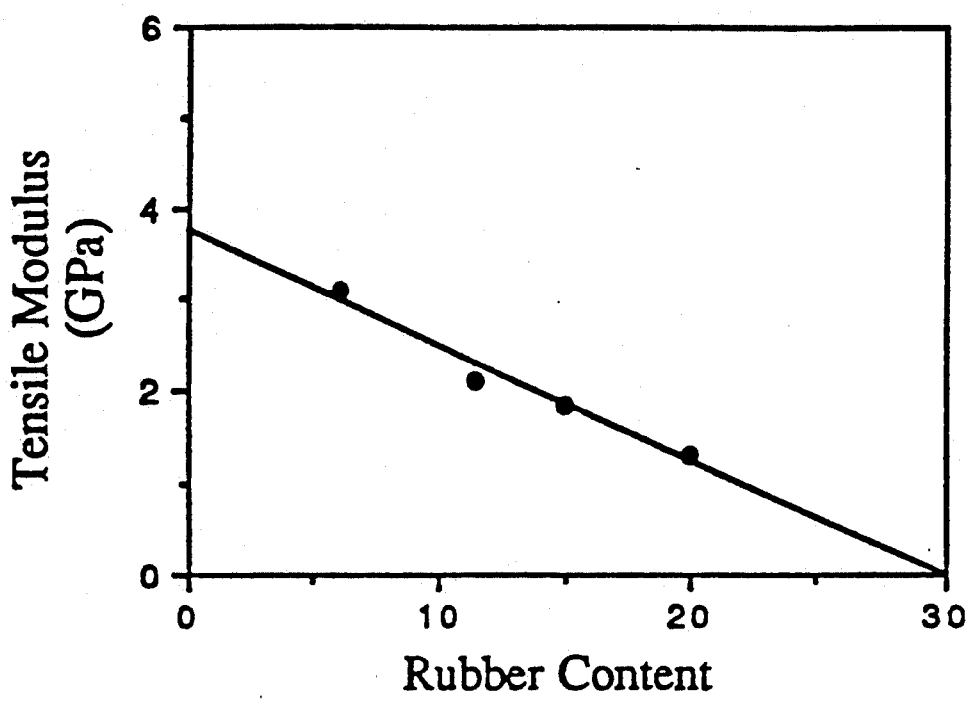

The results in Table IV show that while modulus and UTS fall with increasing rubber content, the % Strain to Failure and $G_{1c}$ increase with increasing rubber content. The ultimate tensile strength, tensile modulus and strain to failure were determined on dog bone shaped specimens from cured plates using ASTM D-638. The $K_{1c}$ values were determined with ASTM E-399 plane strain fracture toughness under mode I fracture, while the $G_{1c}$ value was calculated from $K_{1c}$ with the formula $G_{1c}=(K_{1c})^2\div E$ where E is the Young's modulus. The calculated value of $G_{1c}$ increases by a factor of 10 when the flexible polymer content was increased. The value $K_{1c}$ seems to be affected by the presence of the amine terminated flexible polymer but not specifically by the concentration of that polymer. The data in Table IV is shown in FIGS. 1, 2, 3, 4 and 5 to illustrate the effect of flexible polymer on the modified polyester resin. FIGS. 1, 2 and 3 are based on a UPE: Epon ratio of 2:1 while FIGS. 4 and 5 use an UPE: Epon ratio of 1:1. The ratio of unsaturated monomer and catalyst to UPE was constant. The ratio of ATBN to Epon 828 was varied to get different rubber contents. The amount of Ancamine ® K61B was increased in recipes with lower amounts of ATBN.

EXAMPLE 3

TABLE V

Composition of Filled Composite from Resin

| Component | Amount (g) |
|---|---|
| UPE as MR 13006 | 65 |
| Styrene | 72 |
| 1300X16 | 80 |
| Epon ® 828 | 40 |
| Ancamine ® K61B | 2.20 |
| Magnesium Oxide | 0.8 |
| Calcium Carbonate | 224 |
| Cabosil ® Silica | 9 |
| t-BPB | 2.0 |
| TOTAL: | 495 |

TABLE VI

Composition of Filled & Reinforced Composite from Resin

| Component | Amount (g) |
|---|---|
| UPE MR 13006 | 65 |
| Styrene | 72 |
| 1300X16 | 80 |
| Epon ® 828 | 40 |
| Ancamine ® K61B | 2.20 |
| Magnesium Oxide | 0.8 |
| Calcium Carbonate | 224 |
| Cabosil ® Silica | 9 |
| t-BPB | 1.6 |
| Glass Fibers | 120 g |

TABLE VI-continued

Composition of Filled & Reinforced Composite from Resin

| Component | Amount (g) |
|---|---|
| TOTAL: | 614.6 |

Filled and reinforced composites were made from typical resin using recipes in Tables V and VI. Previous experiments indicate that 45 weight percent filler made effective castings so that amount was used herein. Cabosil ® was added to the recipes with filler to increase viscosity during molding. Magnesium oxide was added to the recipe with glass fibers to aid maturation. The dough of the samples with glass fibers were allowed to mature two days. Maturation is a well known process involving unsaturated polyesters. It involves increases in viscosity due to reactions other than free radical crosslinking. The viscosity increase is beneficial during molding. The weight percent rubber of the modified polyester is approximately 30 percent of the polymerizable species.

The samples were molded at 300° F. under approximately 150 psi pressure. They were then postcured at 120° C. for 10 hours. Teflon sheets coated with zinc stearate were used between the mold surface and the specimen to prevent sticking. The tensile properties of the samples were evaluated with ASTM D-638 with some modifications. The specimens were 0.65 inches in width. A three point bend test, ASTM D790-90 was used to identify the strain necessary to cause failure in the bending mode.

TABLE VII

Physical Properties of Filled Resin Composite

| Sp # | UTS {psi} | Modulus {Msi} (G Pa) | $\epsilon_f$ {%} |
|---|---|---|---|
| 1  | 2322 (16.00) | .324 (2.23) | 3.75 |
| 2* | 2931 (20.19) | .325 (2.24) | 4.03 |
| 3  | 2179 (15.01) | .258 (1.78) | 4.83 |
| 4* | 2825 (19.46) | .371 (2.56) | 3.47 |
| 5  | 2193 (15.11) | .271 (1.86) | 5.28 |
| 6* | 2639 (18.18) | .352 (2.42) | 2.82 |

*specimens cured for 6 hours more than the others. (at 120° C.)

TABLE VIII

Physical Properties of Filled and Reinforced Resin Composites

| Sp # | UTS {psi} (M Pa) | Modulus {Msi} (G Pa) | $\epsilon_f$ {%} |
|---|---|---|---|
| 1 | 7000 (48.23) | .738 (5.08) | 2.488 |
| 2 | 8064 (55.56) | .96 (6.61) | 1.875 |
| 3 | 7414 (51.08) | 1.258 (8.67) | 1.094 |
| 4 | 6680 (46.03) | .868 (5.98) | 1.19 |
| 5 | 8070 (55.60) | .825 (5.68) | 1.703 |

TABLE IX

Results of Three Point Bend Test on Filled and Reinforced Resin Composite of Table VI

| Sp # | Yield Stress {ksi} (M Pa) | Yield Strain {%} | Flex. Mod. {Msi} (G Pa) |
|---|---|---|---|
| Properties of Plate Perpendicular to Long Side Span = 2.046 inches Loading rate = 0.2 in/min | | | |
| 1 | 11 (76) | 4.91 | .344 (2.37) |
| 2 | 13 (90) | 4.41 | .518 (3.57) |
| 3 | 13 (90) | 4.28 | .528 (3.64) |
| 4 | 17 (117) | 3.44 | .618 (4.26) |
| 5 | 14 (96) | 5.77 | .345 (2.38) |
| 6 | 11 (76) | 5.25 | .421 (2.90) |
| Properties of Plate Parallel to Long Side Span = 3 inches Loading Rate = 0.2 in/min | | | |
| 1 | 14 (96) | 2.47 | .661 (4.55) |
| 2 | 17 (117) | 2.936 | .716 (4.93) |
| 3 | 13 (90) | 3.678 | .598 (4.12) |
| 4 | 14 (96) | 3.97 | .559 (3.85) |
| 5 | 14 (96) | 4.62 | .571 (3.93) |

Tables V and VI show that the modified polyester resin is capable of containing large amounts of filler such as calcium carbonate and fiberglass. Tables VII and VIII show the physical properties of the filled and reinforced composites. The modulus values of the filled composite which have an Epon ® to UPE ratio of 1:1, can be compared to the extrapolated modulus of a 30 percent flexible polymer content unfilled modified resin of similar rubber content in FIG. 5. The ultimate tensile strength (UTS) of the filled composite in Tables VII and VIII are much higher than similar unfilled compositions in FIG. 4. Thus, the filled composites made from this modified polyester resin maintain high UTS even though highly filled. They also maintain or increase their modulus slightly as a consequence of adding calcium carbonate fillers. Table VII shows that there are some variations in properties based on cure temperatures and cure times.

Tables VIII and IX show the Physical Properties of a filled glass fiber reinforced composite from the modified polyester resin. The high ultimate tensile strength and modulus of specimen in Table VIII indicates that the fiber polymer interaction serves to increase tensile strength and modulus significantly over samples without fibers shown in Table VII. The $\epsilon_f$ or strain to failure was measured with ASTM D-638 and decreased as a result of fiber reinforcement. Table X shows the composition of a control sample of similar filler and fiber loading to the composition of Table VI. Table XI shows the physical properties by a Three Point Bending Test on the composition of Table X. As can be seen when comparing Table IX and Table XI, the polyester-epoxy resin of this invention has lower modulus and higher yield strain than the control.

TABLE X

Composition and Physical Properties of Control Filled and Reinforced Resin Composite Without Epoxy or Amine-Terminated Flexible Polymer

| Component | Amount |
|---|---|
| UPE as MR 13006 | 150 g |
| Styrene | 109 g |
| Calcium Carbonate | 260 g |
| Cabosil ® Silica | 9.5 g |
| t-BPB | 4.6 g |
| MgO | 10 g |
| Glass Fibers | 150 g |
| Total: | 693.1 |

TABLE XI

| | Yield Stress {ksi} (M Pa) | Yield Strain {%} | Flex Modulus {Msi} (G Pa) |
|---|---|---|---|
| Results of Three Point Bend Test of Filled and Reinforced Control Composition, Properties of Plate Perpendicular to Long Side | | | |
| Avg. | 16.8 (116.) | 3.00 | 0.6 (4.1) |
| SD* | 4.0 (27.6) | 0.12 | 0.12 (0.83) |
| Properties of Plate Parallel to Long Side | | | |
| Avg. | 21.9 (151) | 2.76 | 1.0 (6.9) |
| SD* | 5.9 (40.7) | 0.27 | 0.09 (0.62) |

*SD = Standard Deviation

The composite material of the invention provides a toughened molding material having better crack resistance (i.e. higher strain to failure) and can be molded to form automotive body panels, automotive structural components such as load bearing support members, aircraft components, housings for various electrical and household goods, sporting goods such as golf club shafts, rackets, etc.

While in accordance with the Patent Statutes, the best mode and preferred embodiment has been set forth, the scope of the invention is not limited thereto, but rather by the scope of the attached claims.

What is claimed is:

1. A reaction product of a mixture comprising:
   a) an unsaturated polyester resin,
   b) one or more ethylenically unsaturated monomers,
   c) an epoxy resin having 2 or more epoxy groups per molecule,
   d) an amine-terminated flexible polymer said polymer having a Tg of 0° C. or less and from about 1.7 to about 3 primary or secondary amine groups per polymer, and
   e) a catalyst component for amine-epoxy reactions
   wherein said epoxy resin, said amine-terminated flexible polymer, and said catalyst component for amine-epoxy reactions are reacted in the presence of said one or more ethylenically unsaturated monomers and said unsaturated polyester resin to form a composition which is substantially free of phase separation.

2. A reaction product as set forth in claim 1, wherein said unsaturated polyester and said ethylenically unsaturated monomers are present in combination from about 30 to about 70 parts by weight;
   wherein said epoxy resin is present from about 10 to about 23 parts by weight;

wherein said amine-terminated flexible polymer is present from about 20 to about 47 parts by weight; wherein a catalyst component is present from about 0.1 to about 15 parts by weight; wherein all parts by weight are based on 100 parts by weight of combined components of said polymer composition of epoxy, polyester, ethylenically unsaturated monomers, and amine-terminated flexible polymer.

3. A reaction product as set forth in claim 2, used as a molding compound with fiber reinforcement.

4. The molding compound with fiber reinforcement of claim 2, wherein said amine-terminated flexible segment is an amine-terminated butadiene polymer or an amine-terminated butadiene-acrylonitrile copolymer.

5. A reaction mixture according to claim 2, wherein said epoxy resin is a polyglycidyl ether of bisphenol A, and said amine-terminated flexible polymer is an amine-terminated butadiene-acrylonitrile copolymer.

6. A reaction product as set forth in claim 2, wherein said epoxy resin is polyglycidyl ether of bisphenol A, epoxy phenol novolak, or triglycidyl isocyanurate.

7. A reaction product as set forth in claim 4, wherein said amine-terminated flexible segment is an amine-terminated butadiene polymer or an amine-terminated butadiene-acrylonitrile copolymer.

8. A cured thermoset plastic material formed from a reaction mixture according to claim 2, wherein said composition of unsaturated polyester resin, ethylenically unsaturated monomers, apoxy resin, and amine-terminated flexible polymer is substantially free of phase separation.

9. A reaction product as set forth in claim 2, wherein said polyester and said ethyleically unsaturated monomers are present in combination from about 40 to about 60 parts by weight;
wherein said epoxy resin is present from about 13 to about 20 parts by weight;
wherein said amine-terminated flexible polymer is present from about 27 to about 40 parts by weight;
wherein said catalyst component is present from about 0.2 to about 10 parts by weight; wherein all parts by weight are based on 100 parts by weight of said polymer composition of epoxy, unsaturated polyester, ethylenically unsaturated monomers, and amine-terminated flexible polymer; wherein said ethylenically unsaturated monomers is styrene; and wherein said polymer is used to make structural components.

10. A reaction product as set forth in claim 1, used as a molding compound with fiber reinforcement.

11. A cured thermoset plastic material formed from a reaction product as set forth in claim 2, wherein said composition of unsaturated polyester resin, ethylenically unsaturated monomers, epoxy resin, and amine-terminated flexible polymer is substantially free of phase separation.

* * * * *